United States Patent [19]

Taylor

[11] 4,233,846
[45] Nov. 18, 1980

[54] METHOD AND APPARATUS FOR MEASURING THE IMBALANCE OF A BOWLING BALL

[76] Inventor: Wilson G. Taylor, P.O. Box 42517, San Gabriel, Calif. 90050

[21] Appl. No.: 62,359

[22] Filed: Jul. 31, 1979

[51] Int. Cl.³ .................... G01M 1/04; G01M 1/16
[52] U.S. Cl. .................................. 73/460; 73/471; 73/483
[58] Field of Search ............... 73/65, 66, 460, 480, 73/483, 471

[56] References Cited

U.S. PATENT DOCUMENTS 3,156,067  11/1964  Malko ............................ 73/483

Primary Examiner—James J. Gill
Attorney, Agent, or Firm—Fulwider, Patton, Rieber, Lee & Utecht

[57] ABSTRACT

An apparatus for measuring the imbalance of a bowling ball includes a base, a first gimbal rotatably mounted on the base and a second gimbal rotatably mounted on the first. A ball is supported by the second gimbal and spun while having the same orientation it has when in flight. The ball acts as the rotor of a gyroscope and any imbalance causes precession in the form of rotation of the first gimbal. Indicators carried by the first gimbal and the base aid in observing the direction and rate of precession.

16 Claims, 6 Drawing Figures

U.S. Patent  Nov. 18, 1980  4,233,846
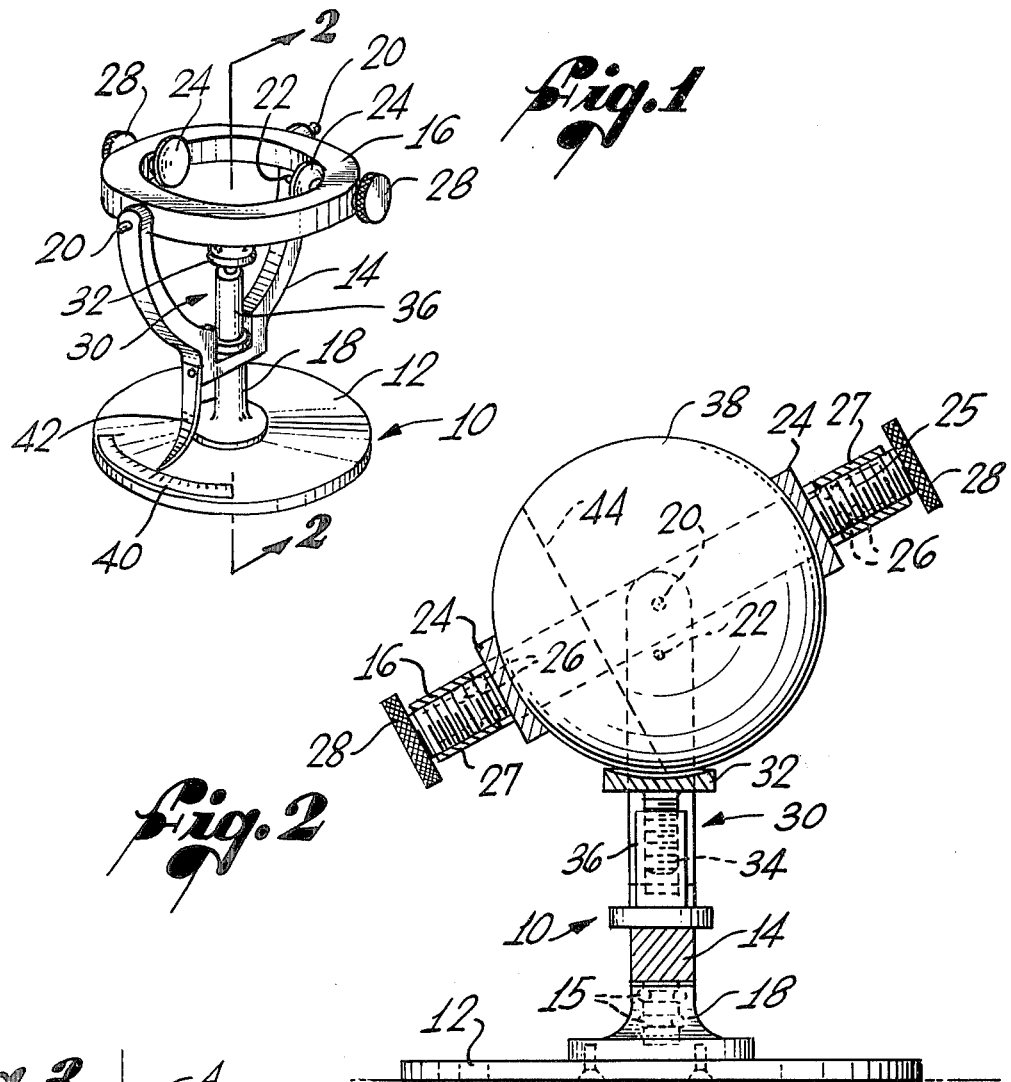
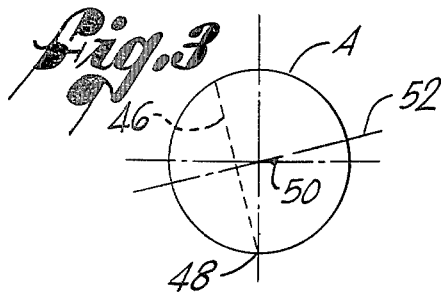
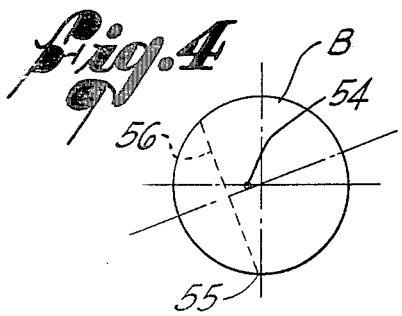
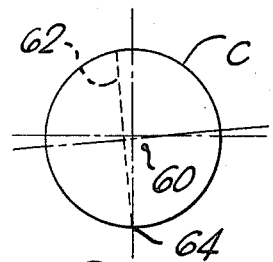
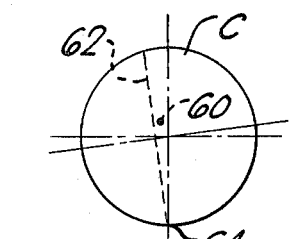

METHOD AND APPARATUS FOR MEASURING THE IMBALANCE OF A BOWLING BALL

BACKGROUND OF THE INVENTION

The present invention relates to the sport of bowling and, more particularly, to apparatus for measuring the imbalance of a bowling ball.

Bowling, as the sport is known in the United States, is conducted according to the rules and standards of the American Bowling Congress. Balls must have a diameter of no more than 27 inches and weigh no more than 16 pounds after the finger holes have been drilled.

The presence of holes dictates that the ball material cannot be of uniform density and still be balanced on all axes passing through its center. Conventionally, a weight, known as the "label weight," is located in the general area where holes are drilled to compensate for the lightening effect of the holes. Some tolerance as to the uniformity of weight distribution is necessary, however, in view of differences in hole sizes. The A.B.C. rules permit maximum amounts of imbalance when measured along various axes of the ball. For example, a maximum difference of three ounces (plus or minus) is permitted between the top half of the ball (the half in which the finger holes are drilled) and the bottom half. This standard allows the ball driller a range of six ounces variation (±3) that he can use, through knowledge of happenstance, to influence the performance of an individual ball. Although permissible imbalance is small when compared to the total weight of the ball, it will be appreciated from a proper understanding of the flight of the ball that this small imbalance is a critical factor in determining ball performance.

As the ball is thrown, it is given velocity in the general direction of the pins and it is given a spin. In most cases the spin axis is not perpendicular to the initial movement of the ball toward the pins. Thus, the ball slides on the alley as it spins but it does not roll, at least not at the beginning of its flight. Eventually, the linear velocity of the ball is reduced, due to frictional forces, and its direction of flight on the alley changes toward alignment with the spin axis. The point at which this change in direction becomes pronounced is called the "roll point." The orientation of the spin axis to the alley when the desired roll point distance is reached is a principal determinant of the ball's ultimate performance.

Since the ball is a heavy spinning mass, it behaves in accordance with those laws of Newtoneon physics known as gyroscope theory. The spin axis remains highly stable at the ball moves down the alley, although there is some tendency for this axis to change due to frictional forces to align itself perpendicular to lateral ball movement. There is also the phenomena of precession to be taken into account.

Precession is caused by the gravity effect on the ball as it rests on its track. If the ball is not perfectly balanced over the track, a torque will result that is opposed by the gyroscopic inertia of the ball. This imbalance torque will cause the spin axis to precess. The inventor terms precession away from the center of the alley "negative" and precession toward the center of the alley "positive."

As the ball rotates on a spin axis not parallel to the alley surface, the center of gravity may move back and forth across the point at which the ball rests on the alley. An oscillatory precession that alternates between positive and negative results. The composite effect may be positive, negative, or neutral.

Skilled ball drillers often attempt to influence the performance of a ball to produce positive or negative precession by drilling the ball in an off-center position with respect to the label, which should, but often does not, accurately indicate the position of the label weight. At times, an additional weight is implanted in the ball at a selected location in an effort to achieve the desired imbalance.

Even after a ball has been drilled and any additional weights have been implanted, it is difficult to empirically determine exactly what has been accomplished. Conventionally, a bowling ball scale is used to statically measure the imbalance. Such a scale determines the added weight that must be suspended from one side of a ball to make it balance on a selected axis and on a selected rest point. This device does not, however, reflect the true imbalance of a ball as it affects the ball's performance. The inventor has determined that the most fundamental shortcomings of this known measuring technique are largely attributable to the inability of such static measurements to properly take into account the fact that the ball contacts the alley on a track that has a smaller diameter than the ball, causing the center of gravity of the ball to shift with respect to its point of contact with the alley as the ball spins. Any static measurement is accurate for only one ball position and can reflect only one of many possible positions of the center of gravity.

Inability to accurately measure the imbalance of a ball in a manner that permits accurate predictions of its performance has resulted in a great deal of mysticism and unscientific thinking in the bowling community. It is often found that a ball simply will not perform in the expected manner. Bowlers are forced to rely on subjective evaluations of a ball and are frustrated by the inability to duplicate a ball that performs favorably.

SUMMARY OF THE INVENTION

The present invention resides in a method and apparatus that permits the imbalance of a bowling ball to be measured dynamically in a gyroscopic manner so that accurate objective measurements of ball characteristics can be made. It includes a base, a first gimbal mounted on the base to permit rotation about a first axis, and a second gimbal mounted on the first gimbal to permit rotation about a second axis perpendicular to the first. Preferably, the second axis intersects the first.

A provision is included for rotatably supporting a bowling ball on the second gimbal. The axis on which the ball is rotatable, as determined by two ball engaging members rotatably attached to the second gimbal, is perpendicular to and intersects the second axis. Once the ball is positioned in the desired orientation within the second gimbal, it can be rotated and gyroscopic precession that reflects the imbalance of the ball can be observed.

The direction of precession indicates whether the imbalance is positive or negative and the rate of precession indicates the amount of imbalance. As an aid in observing precession, indicators, such as a scale and a pointer, are mounted on the base and the second gimbal. The positional relationship between these indicators is a measure of the precession.

According to one embodiment of the invention, the first gimbal has a yoke-shape and is symmetrical about the first axis. The second gimbal is ring-shaped and is attached to the first gimbal at two diametrically opposite locations. The ball engaging members are mounted on the second gimbal at points equidistant from the attachments of the second gimbal to the first.

The apparatus can also include a pedestal of adjustable height. The ball is positioned on the pedestal prior to contact by the ball engaging members. Once the ball has been secured, the pedestal is lowered so that the ball can rotate freely.

Another aspect of the invention is a method according to which a bowling ball is supported so that it is free to rotate about a spin axis perpendicular to a predetermined circular track on its surface. At the same time, the ball is free to precess about a second axis passing through a point on that track. The ball is then rotated and its precession is observed, the imbalance being indicated by the direction and rate of precession.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of an apparatus for measuring the imbalance of a bowling ball, constructed in accordance with the present invention;

FIG. 2 is a cross-sectional view of the apparatus taken along the line 2—2 of FIG. 1, the apparatus being shown with a ball positioned in it;

FIGS. 3 and 4 are diagrammatic illustrations of two bowling balls; and

FIGS. 5 and 6 are diagrammatic illustrations of a third bowling ball shown in two different rotational positions.

DESCRIPTION OF THE PREFERRED EMBODIMENTS

An apparatus 10, shown in FIGS. 1 and 2 of the drawings, embodies many features and advantages of the present invention. In general, it includes a base 12, a first gimbal 14 that is rotatable on the base and a second gimbal 16 that is rotatable on the first.

The base 12 is generally disk-shaped and horizontal, having a short post 18 that projects upwardly at its center. The first gimbal 14 is yoke-shaped forming an open end or mouth that faces upwardly. It is symmetrical about a vertical axis that is coincident with the longitudinal axis of the post 18 on which it is rotatably supported on bearings 15.

The second gimbal 16 is ring-shaped and fits within first gimbal 14. It is rotatably attached to the first gimbal 14 by low friction bearings 20 at two diametrically opposite attachment points. Rotation of the second gimbal 16 is limited by two studs 22 (only one of which is visible in FIG. 1) that project inwardly from the first gimbal 14.

The second gimbal 16 carries a pair of diametrically opposed, cup-shaped, ball engaging members 24, each of which is equidistant from the attachment points and bearings 20. Each ball engaging member 24 faces the open center of the second gimbal 16 and is mounted on a shaft 25 that extends radially from its center into the second gimbal 16 where it is supported on low friction bearings 26 within a sleeve 27. On the outer end of each sleeve 27 is a handle 28. The sleeve is threaded externally to mate with internal threads of the second gimbal 16. By turning the handle 28, the corresponding cup-shaped ball engaging member 24 is caused to move radially toward or away from the center of the second gimbal 16.

Mounted on the center of the first gimbal 14, aligned with the post 18, is a pedestal 30 that includes an upwardly facing cup-shaped member 32, similar to the cup-shaped members 24 mentioned above. A downwardly projecting externally threaded stem 34 on the pedestal 30 (shown in phantom lines in FIG. 1) is received by an internally threaded socket 36 that projects upwardly from the first gimbal 14. By rotating the cup-shaped member 32, it is possible to vary the height of the pedestal 30 and to adjust the height at which a bowling ball 38 is supported on the pedestal.

On the base 12 is an arcuate scale 40 (shown in FIG. 1) that includes a zero point and a series of markings. A pointer 42 carried by the first gimbal 14 indicates movement of that gimbal by its positional relationship to the scale 40.

The use of the apparatus 10 and the method of the present invention will now be explained. It is desired to determine the imbalance of the bowling ball 38. This is a conventional three-hole ball that includes a label weight (not shown) and may include other weights as well.

Imbalance of the bowling ball 38 must be determined with reference to a track on which the ball contacts the alley when thrown by an individual bowler. A particular track 44 of interest is indicated on the ball 38 by a dashed line in FIG. 2.

The track of a ball that has been used by one bowler is apparent from an inspection of the ball. Since the ball contacts the alley primarily on its track, which is a circle on the surface of the ball, clearly discernable scratches and nicks will mark the track. If it is desired to determine the imbalance of a new ball, the track that ball will have when used by a particular bowler can be determined, or at least approximated, by inspection of an older ball the bowler has used.

As the first step in properly positioning the ball 38 within the apparatus 10, the pedestal 30 is raised until it supports the ball in such a position that the axis on which the second gimbal 16 rotates on the first passes through the center of the ball. The ball 38 is then placed on the pedestal 30 so that a point on the ball track 44 of interest rests on the center of the pedestal cup 32. The second gimbal 16 is oriented so that a line passing through the ball 38 engaging members 24 is perpendicular to the plane in which the track lies and the ball engaging members are tightened against the surface of the ball to hold it firmly.

While maintaining the relative position of the first and second gimbals 14 and 16 and the ball 38, the first gimbal 14 is rotated until the pointer 42 is opposite the zero mark of the scale 40. The pedestal cup 32 is then lowered to disengage the ball 38 and the ball is rotated while supported on the second gimbal 16.

Once rotation of the ball 38 has begun, the position of the first and second gimbals 14 and 16 becomes highly stable due to the gyroscopic effect of the large mass of the ball. The angular position of the second gimbal 16 will, therefore, remain constant with respect to the first gimbal 14. If, however, the ball 38 has any imbalance with respect to the selected track 44, the first gimbal 14 will rotate with respect to the base 12. This rotation of the first gimbal 14 is a precession of the gyroscope rotor formed by the ball 38.

The phenomenon of precession as it applies to the ball 38 and the apparatus 10 is best understood with reference to FIGS. 3 through 6 which show various ball tracks and the relationship of those tracks to the center of gravity of various balls A, B and C. In FIG. 3, the track 46 of the ball A is to the left of the point 48 on which the ball rests, but the center of gravity 50 of the ball is to the right of that rest point. Because of this offset of the center of gravity 50, the ball A experiences a torque as it rotates on a spin axis 52 passing perpendicularly through the track. In accordance with the laws of gyroscopic motion, this torque will cause the spin axis 52 to precess in a direction at a 90-degree angle to the torque axis. In this case, since the center of gravity 50 of the ball A is on the opposite side of the rest point 48 from the track 46, the precession will be positive, as that term is defined above. In other words, the angle between the axis 52 on which the ball A rotates and the direction of flight of the ball down the alley will increase as the ball moves toward the pins. When the ball A is tested on the apparatus 10 of the invention, a corresponding positive reading on the scale 40 will result.

Another ball B, shown in FIG. 4, has an opposite imbalance. That is, the center of gravity 54 of the ball B is on the same side of the rest point 55 as the track 56. Accordingly, the precession of the spin axis 57 of the ball B will be opposite the precession of the spin axis 52 of the ball A. The precession will be negative. As a result, the ball B will reach its roll point and break toward the pins at an earlier point in its flight if thrown in the same manner as the ball A. A negative reading on the scale 40 will indicate this characteristic.

A more complex relationship between the center of gravity 60 and the track 62 of the ball C is shown in FIGS. 5 and 6. Here, the center of gravity 60 is on the opposite side of the rest point 64 from the track 62 when the ball C is in the position shown in FIG. 5, but the center of gravity is not displaced very far from the rest point when measured horizontally. As the ball C rotates, however, the center of gravity 60 will cross over the rest point 64, since it is not in the center of the ball C, and will reach the position shown in FIG. 6. Thus, when the ball C is in the position shown in FIG. 5, the precession is positive, but when the same ball rotates to the position shown in FIG. 6, the precession is negative. As it proceeds down the alley, the ball C will oscillate between positive and negative precession. The positive and negative precession periods, which each occur once during a single revolution, may completely cancel each other, and the ball C may, in effect, have no imbalance. In the majority of instances, however, the period of one type of imbalance or the other will predominate.

It will be appreciated from this example (FIGS. 5 and 6) that it is extremely difficult to measure the effect of the imbalance of the ball C in a static manner since the ball appears to have positive precession characteristics when in one rotational position (FIG. 5) and negative precession characteristics when in another rotational position (FIG. 6). When measured according to the present invention, however, the actual precession caused by gyroscopic forces can be observed. Composite precession of the spin axis over a period of time is translated into rotation of the first gimbal 14. The direction of movement of the pointer 42 on the scale 40 will reflect either positive or negative precession. The magnitude of this precession over a timed period indicates the rate of precession so that the imbalance characteristics of different balls can be compared quantitatively.

While a particular form of the invention has been illustrated and described, it will also be apparent that various modifications can be made without departing from the spirit and scope of the invention.

I claim:

1. An apparatus for measuring the imbalance of a bowling ball comprising:
    a base;
    a first gimbal;
    means for mounting said first gimbal on said base so as to permit rotation of said first gimbal about a first axis;
    a second gimbal;
    means for mounting said second gimbal on said first gimbal so as to permit rotation about a second axis perpendicular to said first axis; and
    means for rotatably supporting a bowling ball on said second gimbal, whereby said ball can be placed in a desired orientation and rotated while supported by said second gimbal and gyroscopic precession can be observed.

2. The apparatus of claim 1 further comprising first and second indicators carried by said gimbal and said base, whereby said precession is indicated by the positional relationship between said indicators.

3. The apparatus of claim 1 further comprising:
    a pointer carried by said first gimbal; and
    a scale marked on said base, whereby said precession is indicated by the positional relationship of said pointer to said scale.

4. The apparatus of claim 1 further comprising means for temporarily supporting said ball prior to engagement of said ball by said means for rotatably supporting said ball.

5. The apparatus of claim 4 wherein said means for temporarily supporting said ball includes a pedestal the height of which is adjustable with respect to said base.

6. The apparatus of claim 1 wherein said first gimbal is yoke-shaped and said second gimbal is ring-shaped.

7. The apparatus of claim 1 wherein said means for rotatably mounting said ball includes a pair of rotatable ball engaging members that are positioned to permit rotation of said ball about an axis perpendicular to said second axis.

8. An apparatus for measuring the imbalance of a bowling ball comprising:
    a base;
    a symmetrical yoke-shaped first gimbal;
    means for mounting said first gimbal on said base so as to permit rotation of said first gimbal about a first axis coincident with the axis of symmetry of said first gimbal;
    a ring-shaped second gimbal;
    means for mounting said second gimbal on said first gimbal so as to permit rotation of said second gimbal about a second axis perpendicular to said first axis; and
    means for supporting a bowling ball on said second gimbal so as to permit rotation of said ball about a spin axis perpendicular to said second axis, whereby said ball can be placed in a desired orientation and rotated while supported by said second gimbal and gyroscopic precession can be observed.

9. The apparatus of claim 8 wherein:
    said second gimbal is supported by said first gimbal at two diametrically opposite attachment points; and
    said means for supporting said ball includes two diametrically opposed ball engaging members, each of said ball engaging members being equidistant from said two attachment points.

10. The apparatus of claim 8 further comprising:
a pointer carried by said first gimbal; and
a scale marked on said base, whereby said precession is indicated by the positional relationship of said pointer to said scale.

11. The apparatus of claim 8 further comprising means for temporarily supporting said ball prior to engagement of said ball by said means for rotatably supporting said ball.

12. The apparatus of claim 11 wherein said means for temporarily supporting said ball includes a pedestal the height of which is adjustable with respect to said base.

13. An apparatus for measuring the imbalance of a bowling ball comprising:
a base;
a symmetrical yoke-shaped first gimbal;
means for mounting said first gimbal on said base so as to permit rotation of said first gimbal about its axis of symmetry;
a ring-shaped second gimbal;
means for mounting said second gimbal on said first gimbal at two diametrically opposed attachment points so as to permit rotation about a second axis perpendicular to said first axis;
ball mounting means for supporting said bowling ball on said second gimbal so as to permit rotation of said ball about a spin axis perpendicular to said second axis, said ball mounting means comprising a pair of diametrically opposed ball engaging members each equally spaced from said attachment points;
temporary ball support means for supporting said ball prior to engagement of said ball by said ball engaging members, said temporary ball support means comprising a pedestal the height of which is adjustable with respect to said base;
a pointer carried by said first gimbal; and
a scale marked on said base, whereby said ball can be placed in a desired orientation and rotated while supported by said second gimbal and gyroscopic precession can be observed by noting the positional relationship between said pointer and said scale.

14. A method for determining the imbalance of a bowling ball comprising:
supporting said ball so that it is free to rotate about a spin axis perpendicular to a predetermined track on its surface and free to precess about an axis passing through a point on said track;
rotating said ball about said spin axis; and
observing the precession of said ball.

15. A method for determining the imbalance of a bowling ball comprising:
providing a first gimbal rotatable about a first axis;
providing a second gimbal supported by said first gimbal and rotatable about a second axis perpendicular to said first axis;
positioning a bowling ball within said second gimbal so that a point on a predetermined track of said ball is aligned with said first axis;
rotatably securing said ball to said second gimbal at locations lying on a spin axis of said ball perpendicular to said track;
rotating said ball about said spin axis; and
observing the precession of said ball.

16. A method for determining the imbalance of a bowling ball comprising:
providing a first gimbal rotatable about a first axis;
providing a second gimbal supported by said first gimbal and rotatable about a second axis perpendicular to said first axis;
positioning a pedestal beneath said second gimbal;
placing a bowling ball on said pedestal so that a point on a predetermined track of said ball is aligned with said first axis;
rotatably securing said ball to said second gimbal at locations lying on a spin axis of said ball perpendicular to said track;
disengaging said pedestal from said ball;
rotating said ball about said spin axis; and observing the precession of said ball.

* * * * *